US012035119B2

(12) United States Patent
Hazelwood

(10) Patent No.: US 12,035,119 B2
(45) Date of Patent: Jul. 9, 2024

(54) BASE SPEAKER SYSTEM FOR USE WITH TURNTABLE THAT ELIMINATES FEEDBACK, RESONANCE, AND OTHER AUDIO-DISRUPTIVE NOISE

(71) Applicant: Andover Audio LLC, Andover, MA (US)

(72) Inventor: Robert Hazelwood, Amesbury, MA (US)

(73) Assignee: Andover Audio LLC, Andover, MA (US)

( * ) Notice: Subject to any disclaimer, the term of this patent is extended or adjusted under 35 U.S.C. 154(b) by 0 days.

(21) Appl. No.: 17/669,618

(22) Filed: Feb. 11, 2022

(65) Prior Publication Data

US 2022/0303686 A1 Sep. 22, 2022

Related U.S. Application Data

(60) Provisional application No. 63/128,902, filed on Dec. 22, 2020.

(51) Int. Cl.
*H04R 5/02* (2006.01)

(52) U.S. Cl.
CPC ........... *H04R 5/02* (2013.01); *H04R 2420/07* (2013.01)

(58) Field of Classification Search
CPC .............................. H04R 5/02; H04R 2420/07
See application file for complete search history.

(56) References Cited

U.S. PATENT DOCUMENTS

| | | | | |
|---|---|---|---|---|
| 2,516,353 A * | 7/1950 | Strauss | G11B 33/06 | 369/69 |
| 3,342,498 A * | 9/1967 | Eberhardt | G11B 25/04 | 181/148 |
| 2008/0144478 A1* | 6/2008 | Frederick | G11B 3/64 | 369/264 |
| 2018/0070160 A1* | 3/2018 | Concorso | H04R 9/06 | |

* cited by examiner

*Primary Examiner* — Andrew L Sniezek
(74) *Attorney, Agent, or Firm* — Gearhart Law LLC

(57) ABSTRACT

A base speaker system for use with a turntable that eliminates feedback playback while playing vinyl records is described. The base speaker system for use with the turntable prevents feedback, resonance, or other audio-disruptive noise that typically occurs when a turntable is placed near to a speaker system. Moreover, the base speaker system may be a standalone model that receives a turntable thereon or may be configured as a cabinet assembly for a built-in setup.

14 Claims, 17 Drawing Sheets

BASE SPEAKER SYSTEM FOR USE WITH TURNTABLE THAT ELIMINATES FEEDBACK, RESONANCE, AND OTHER AUDIO-DISRUPTIVE NOISE

CLAIM OF PRIORITY

The present application is a non-provisional which claims priority from U.S. Application Ser. No. 63/128,902, filed Dec. 22, 2020, the contents of which are herein fully incorporated by reference in its entirety.

FIELD OF THE EMBODIMENTS

The field of the invention and its embodiments relate to a speaker system for use with a turntable that eliminates feedback playback while playing vinyl records. Further, the field of the invention and its embodiments relate to a base speaker system for use with a turntable that prevents feedback, resonance, and other audio-disruptive noise that typically occur when a turntable is placed next to or directly atop a speaker system.

BACKGROUND OF THE EMBODIMENTS

In a typical speaker driver, or a transducer that converts an electrical audio signal to sound waves, the sound waves emanating from the front of the driver are 180 degrees out of phase with the sound waves emanating from the rear. The resulting unwanted sound cancellation is the reason that most speakers are fitted in enclosures. Enclosing a speaker serves to isolate the sound emanating from the front of the speaker from that emanating from the rear. However, even an enclosed speaker system can produce unwanted noise, where the problem is greater with woofer loudspeakers as compared to tweeter loudspeakers. As the volume of the sound increases, a buzzing sound may occur, which is produced by sympathetic vibration of the speaker enclosure. This sound can become worsened when the surface upon which the speaker system rests vibrates sympathetically.

This problem is exacerbated with phonographs, which have built-in speakers. A phonograph or a record player has a rotating turntable upon which a record sits and a cantilevered tone arm, which further comprises amplification electronics, a needle, and a magnetic or piezoelectric transducer, known as a cartridge. In a record player, the small needle fits inside the groove of the rotating record. Variations in the topography of the groove cause the needle to vibrate. The cartridge translates the vibrations into electrical signals that propagate through the amplification system to the speaker. As the sound is produced, the loudspeakers cause the phonograph chassis to vibrate sympathetically. These vibrations are picked up by the cartridge and ultimately transmitted to the speakers, which results in feedback. One proposed solution to this problem is remotely mounting speakers a distance away from the turntable. However, this solution fails to effectively remedy the problem when a self-contained phonograph is desired. Thus, what is needed is a system for use with a turntable that prevents feedback, resonance, and other audio-disruptive noise that typically occur when a turntable is placed near to a speaker system.

REVIEW OF RELATED TECHNOLOGY

U.S. Pat. No. 6,296,238B1 describes a device that dampens vibrations between objects, especially for preventing the transfer of vibrations from a primary object subjected to vibrations, to a vibration-sensitive secondary object. The secondary object is non-rigidly supported by a damping body, which has the same or essentially the same size of mass as the secondary object, and which in turn is non-rigidly supported on the primary object.

U.S. Pat. No. 9,607,650B2 describes electro-mechanical devices and related computer control and audio processing systems intended to optimize playback fidelity of phonograph records. The recordings are manufactured by a process that employs a cutting head assembly driven in a straight path from the outer to the inner-most radius of the recordable surface. However, most record turntables device that are used to play back phonograph records rely on a stylus transducer attached to the end of a pivoting arm. Instead of the linear path followed by the original cutting head, the tonearm traces an arc across the surface of the recorded disk resulting in playback distortion proportional to error in alignment of the stylus relative to the tangent of the groove.

U.S. Pat. No. 4,284,279A describes a record player for use with a stationary conventional record disc having a spiral sound groove with signals recorded therein that includes a freely movable body which is placed on the record disc, a drive assembly for causing the movable body to effect random movements over the record disc, a pick-up or cartridge pivotally mounted at the underside of the movable body to pivot about a pivot axis for engaging the sound groove and reproducing the signals recorded therein while tracking the spiral sound groove as the movable body travels on the record disc, and a guide assembly for controlling the travel of the movable body relative to the record disc in response to pivotal movement of the pick-up. The guide assembly includes a guide wheel disposed in advance of the pivot axis so that the guide wheel provides a radial inward force to compensate for centrifugal forces acting on the movable body in moving in a generally circular path defined by turns of the spiral sound groove.

JP09271092A describes a solution aimed at reducing an undesired vibration of speaker equipment itself by mounting both a speaker unit being a vibration source and a passive radiator directly to a baffle plate so as to reduce the undesired vibration of a sub-baffle plate. The speaker unit is fitted reversely to a passive radiator and a rear side acoustic output of the speaker unit is delivered to the passive radiator via air in a front enclosed chamber, and an acoustic output is obtained from the passive radiator. In this case, a sub-baffle plate is used to specially separately the front enclosed chamber and a rear enclosed chamber and the speaker being a vibration source and the passive radiator are directly mounted to the baffle plate with highest rigidity, then undesired vibration of the sub-baffle plate is considerably reduced by a reaction of the speaker unit and the undesired vibration of the speaker equipment itself is reduced.

Various similar systems exist in the art. However, their means of operation are substantially different from the present disclosure, as the other inventions fail to solve all the problems taught by the present disclosure.

SUMMARY OF THE EMBODIMENTS

The present invention and its embodiments relate to a base speaker system for use with a turntable that eliminates feedback playback while playing vinyl records. Further, the present invention and its embodiments relate to a base speaker system for use with a turntable that prevents feedback, resonance, or other audio-disruptive noise that typically occur when a turntable is placed nearby or directly atop a speaker system.

An embodiment of the present invention describes a system. The system generally includes a turntable disposed on a base speaker system. The base speaker system is configured as an enclosure having an internal portion and an external portion. Moreover, the base speaker system is configured to eliminate audio-disruptive noise. The base speaker system may be a standalone model that receives a turntable thereon or may be configured as a cabinet assembly for a built-in setup.

In general, the base speaker system comprises: a power input to power the base speaker system; a phono input; a built-in phono preamp; one or more woofers; one or more tweeters; and a power amplifier used to drive the loudspeakers, among other components not explicitly listed. In examples, the base speaker system further comprises a connection means to connect a device to the base speaker system. The device includes the turntable, a streaming device, a CD player, a subwoofer, and/or headphones, among others.

The internal portion of the base speaker system further comprises: a Bluetooth or Bluetooth Low Energy electronic receiver or transmitter to communicate with a Bluetooth or Bluetooth Low Energy electronic receiver or transmitter of a computing device. Further, in examples, a quantity of the one or more woofers is four such that the one or more woofers are low frequency transducers located on opposing sides of the base speaker system to cancel vibrations from an opposite channel. In other examples, a quantity of the one or more tweeters is two, where each of the one or more tweeters is located at the front of the enclosure to improve sound coverage in the listening area.

In preferred implementations, the base speaker system is configured to mix stereo channels to mono signals at low bass frequencies to maintain a vibration cancelling effect such that any dynamic signal processing or equalization required by different models is performed on a monaural signal. The frequencies above the monaural signal are maintained as stereo signals to maintain stereo separation. Further, the base speaker system is further configured to perform low frequency monaural signal mixing via a digital signal processing means or via analog circuitry. Additionally, the base speaker system is further configured to mix the monaural signal back into the stereo signal path for delivery to loudspeakers.

In other examples, the base speaker system is further configured to minimize a vibration of a surface intended to place the turntable, by bracing it to its opposite panel, such that the panels vibrate in equal and opposite directions based on an audio signal and provide cancellation of the vibration that remains after the first part.

DESCRIPTION OF THE PREFERRED EMBODIMENTS

Figure 1:
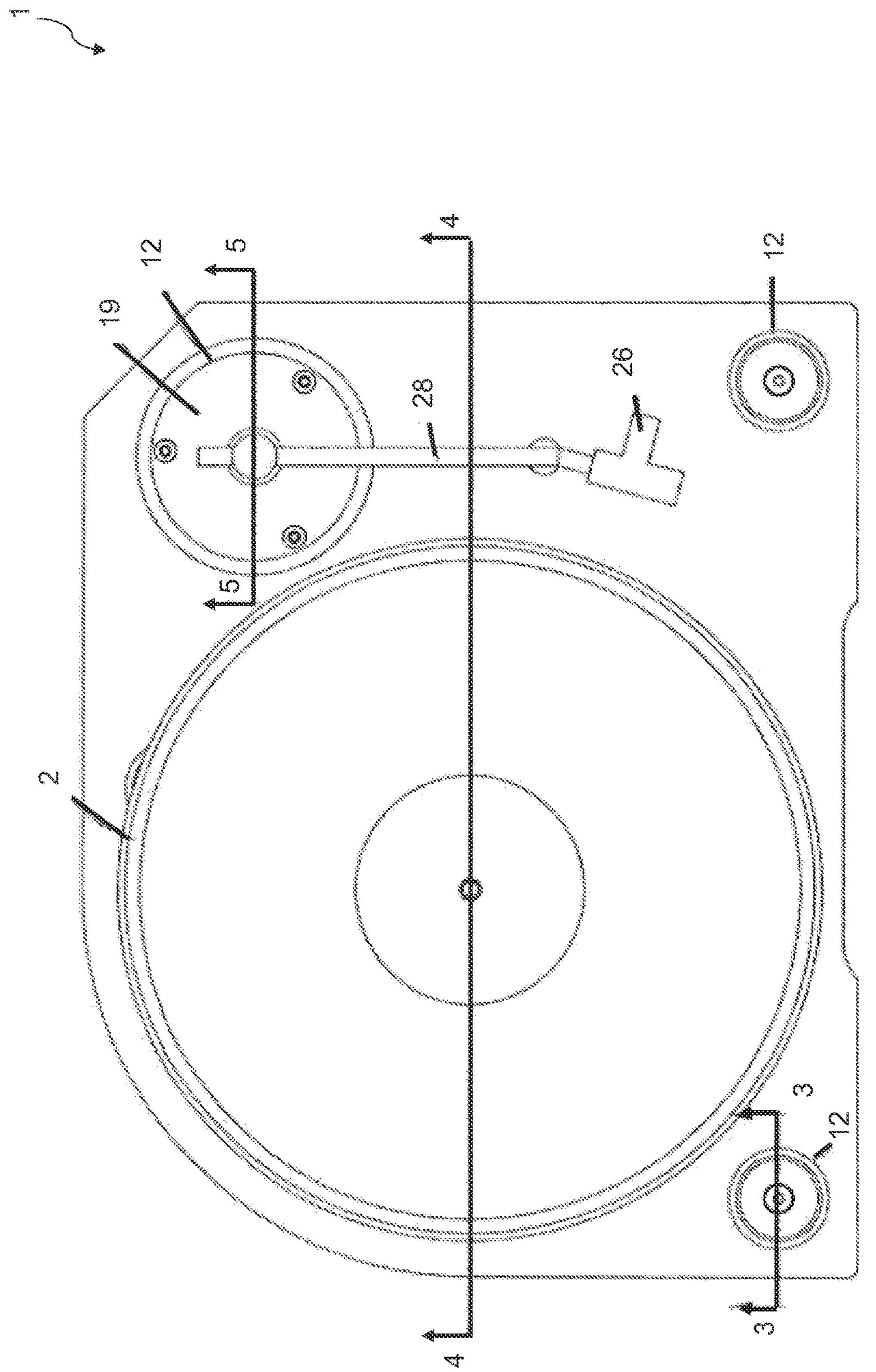
FIG. 1 Prior Art
FIG. 1 depicts a top down view of a prior art turntable, in accordance with embodiments of the present invention.
Figure 2:
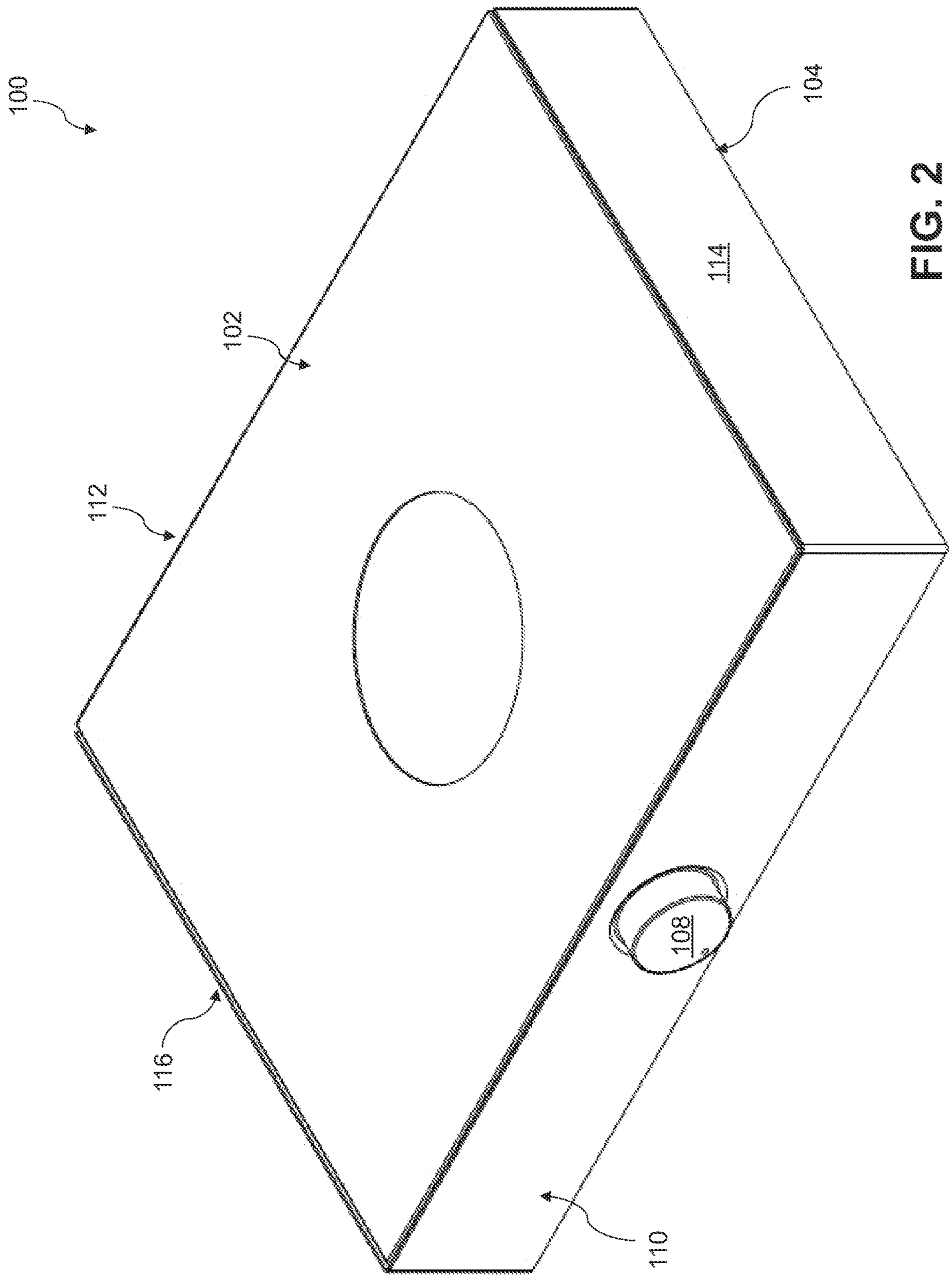
FIG. 2 depicts a perspective view of a standalone base speaker system that receives a turntable thereon, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As described herein, an "audio transducer" is a device that converts energy from electrical signals into mechanical energy. The energy then causes vibrations in speakers that transforms into acoustic waves, which may be transmitted through the air.

As described herein, a "speaker driver" is a transducer that converts an electrical audio signal to sound waves, where the conversion occurs when a flexible membrane or diaphragm is induced to vibrate at audible frequencies. The vibrations thus produced propagate through the air as sound waves.

As described herein, a "subwoofer" amplifies current and converts it to sound through the use of a magnetic coil that causes vibration of the driver's cone. This vibration results in low frequency sound waves being sent out through the air.

As described herein, a "tweeter loudspeaker" vibrates most efficiently at high audio frequencies, typically between 2,000 Hz and 20,000 Hz. The sound emanating from tweeter loudspeakers is deemed "treble."

As described herein, a "woofer loudspeaker" vibrates most efficiently at low audio frequencies, typically between 40 Hz and 2000 Hz and the sound emanating from woofer loudspeakers is deemed "bass."

As explained herein, in a typical speaker driver, the sound waves emanating from the front of the driver are 180 degrees out of phase with the sound waves emanating from the rear. The resulting unwanted sound cancellation is the reason that most speakers are fitted in enclosures. Enclosing a speaker serves to isolate the sound emanating from the front of the speaker from that emanating from the rear. However, even an enclosed speaker system can produce unwanted noise, where the problem is greater with woofer loudspeakers as compared to tweeter loudspeakers. Due to Newtonian physics, the vibration is also transferred to the structure the supporting the transducer as a force reaction. As the volume of the sound increases, a buzzing sound may occur, which is produced by sympathetic vibration of the speaker enclosure. This sound can become worsened when the surface upon which the speaker system rests vibrates sympathetically.

This problem is exacerbated with phonographs, which have built-in speakers. As described herein, a "phonograph" or a "record player" has a rotating turntable upon which the record sits and a cantilevered tone arm, which further comprises a needle, and a magnetic or piezoelectric transducer commonly referred to as a "cartridge," and amplification electronics. In a record player, the small needle fits inside the groove of the rotating record. Variations in the topography of the groove cause the needle to vibrate. The cartridge translates the vibrations into electrical signals that propagate through the amplification system to the speaker. As the sound is produced, the phonograph chassis vibrates sympathetically. These vibrations are picked up by the cartridge and ultimately transmitted to the speakers, which results in feedback.

It should be appreciated that the record described herein comprises a vinyl record. Vinyl records are divided into four categories: (1) 12 inch record albums, long playing, or "LP" records; (2) 12 inch single records; (3) 7 inch single records; and (4) extended play records or "EPs." The LP records are thick, vinyl record albums that typically play at 33⅓ revolutions per minute ("RPM", or how many times the vinyl record will spin completely in one full minute). The 12 inch single records are often said to have an "A side" and a "B side," where the A side typically has one song from an album or a single release and the B side was used for the other songs on the album, remixes or live recordings. The 7 inch single records typically have one song on each side. Moreover, the EPs are a mix between the LPs and the single records and typically have more songs than the 12 inch single records or the 7 inch single records. Further, the EPs typically come in 7 inches or 12 inches and are designed for 33⅓ rpm or 45 rpm.

A turntable 1 known in the art field is depicted in FIG. 1. The turntable 1 comprises numerous components, such as: a rotating platter 2 that supports a phonograph record, a drive source for the rotating platter 2, a base (not shown) to mount a bearing for the rotating platter 2, a motor mounting, and a pickup arm mounting. The base is the heart of the turntable 1 and supports all energy generating parts. In examples, the drive source may be a motor, a pulley, a belt, etc. In some examples, a mat is used to place the phonograph record on the rotating platter 2 to reduce vibrations within the vinyl as a stylus 26 is tracking grooves of the phonograph record.

As shown in FIG. 1, a tone arm 28 is mounted to an upper armboard section 19. Further, as shown in FIG. 1, a 3-3 line, a 4-4 line, and a 5-5 line are depicted across various components for reference. To remedy the problems of feedback discussed herein in typical systems, the present invention describes a base speaker system for use with a turntable that prevents feedback, resonance, or other audio-disruptive noise that typically occur when a turntable is placed near a speaker system. Specifically, the present invention describes a system that includes at least a turntable (e.g., such as the turntable 1 of FIG. 1) mounted on a base speaker system 100 (e.g., the base speaker system 100 is a standalone system that receives the turntable 1 thereon). In examples, the turntable may comprise a base portion having one or more feet or protrusions disposed thereon for contacting a top or first side 102 of the base speaker system 100.

Figure 3:
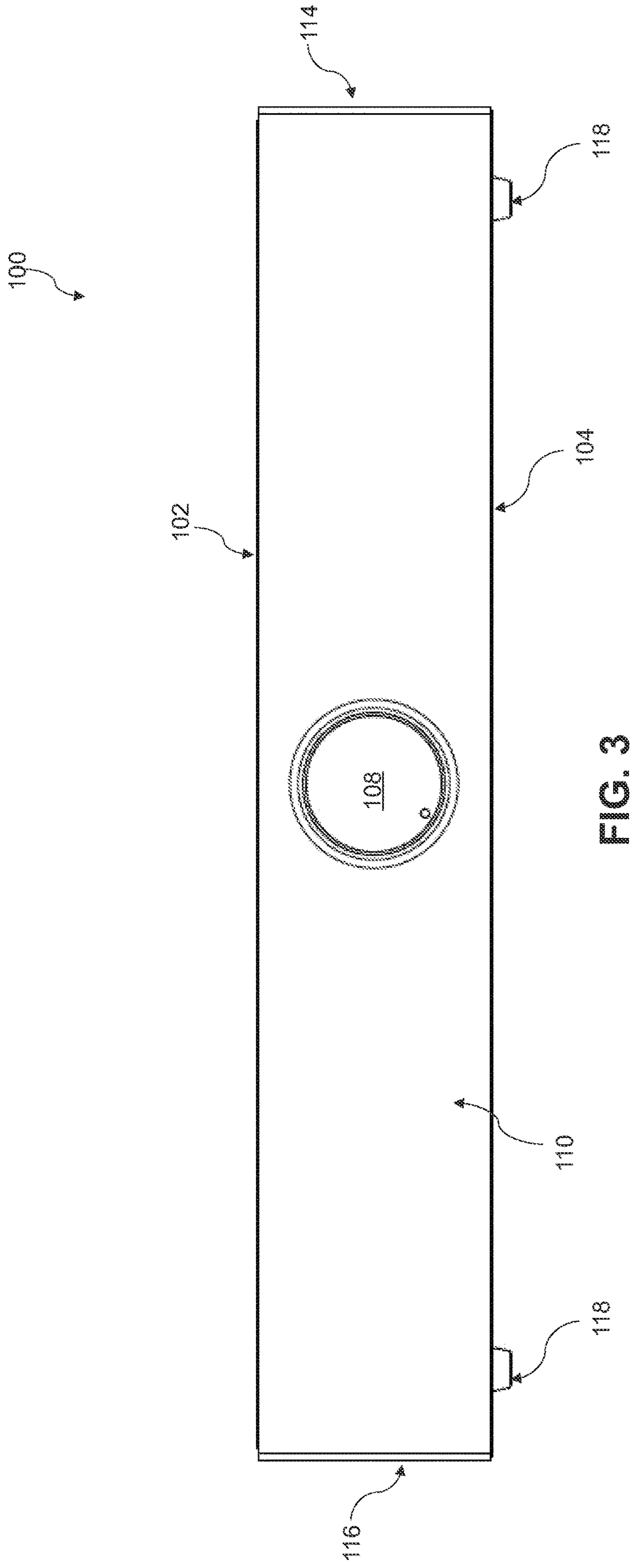
FIG. 3 depicts a front view of a standalone base speaker system that receives a turntable thereon, in accordance with embodiments of the present invention.
Figure 6:
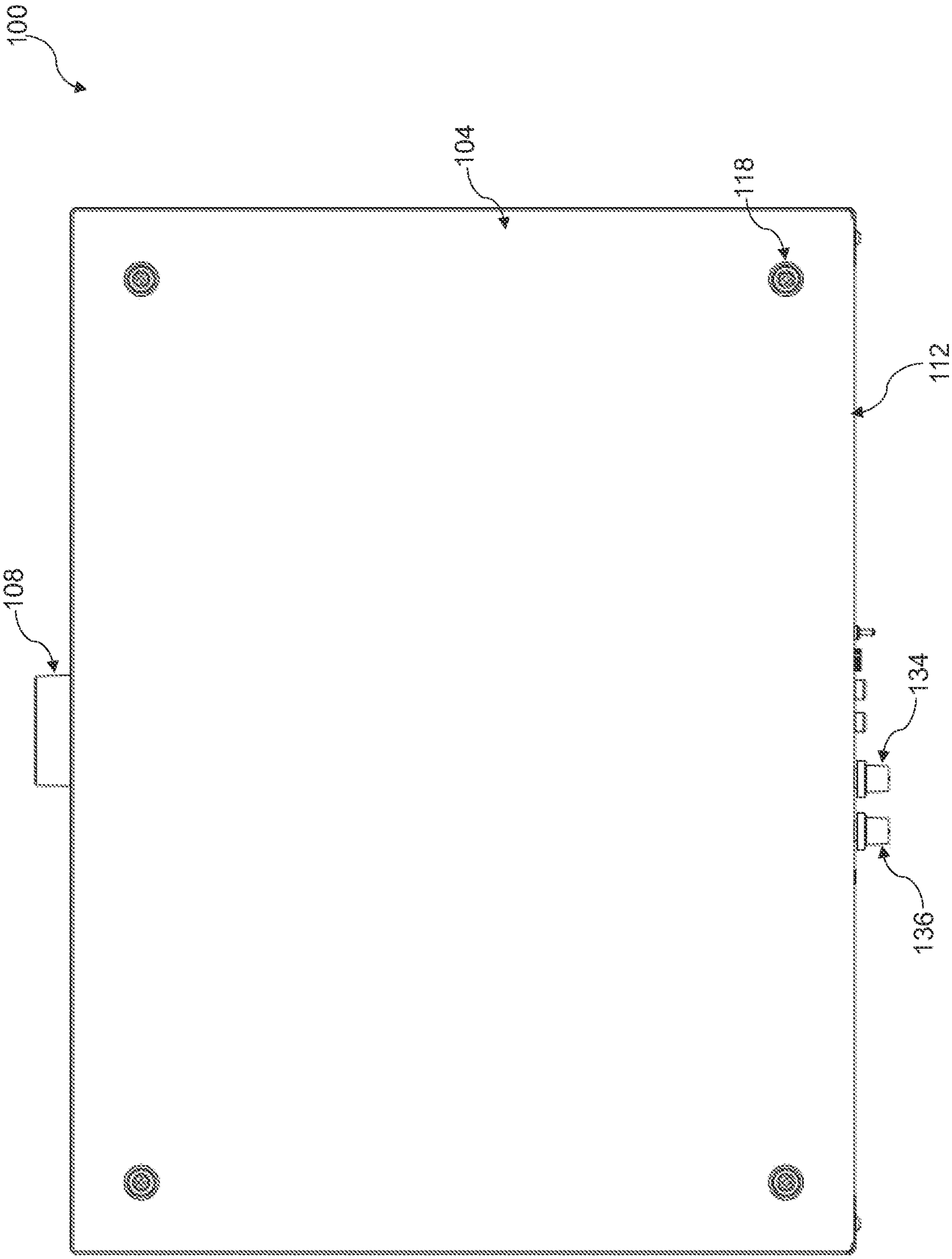
FIG. 6 depicts a bottom up view of a standalone base speaker system that receives a turntable thereon, in accordance with embodiments of the present invention.
Figure 7:
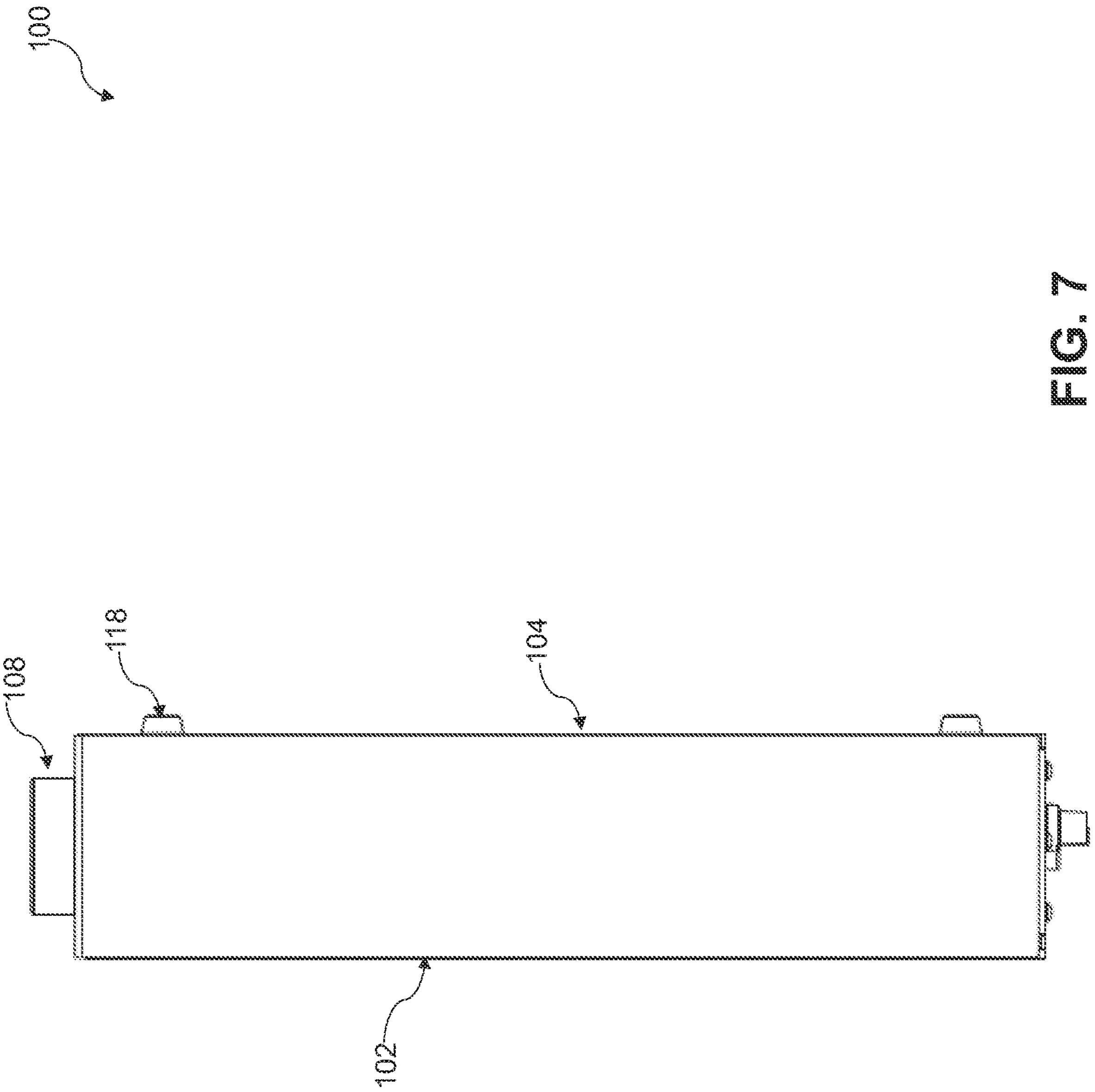
FIG. 7 depicts a side view of a standalone base speaker system that receives a turntable thereon, in accordance with embodiments of the present invention.
Figure 8:
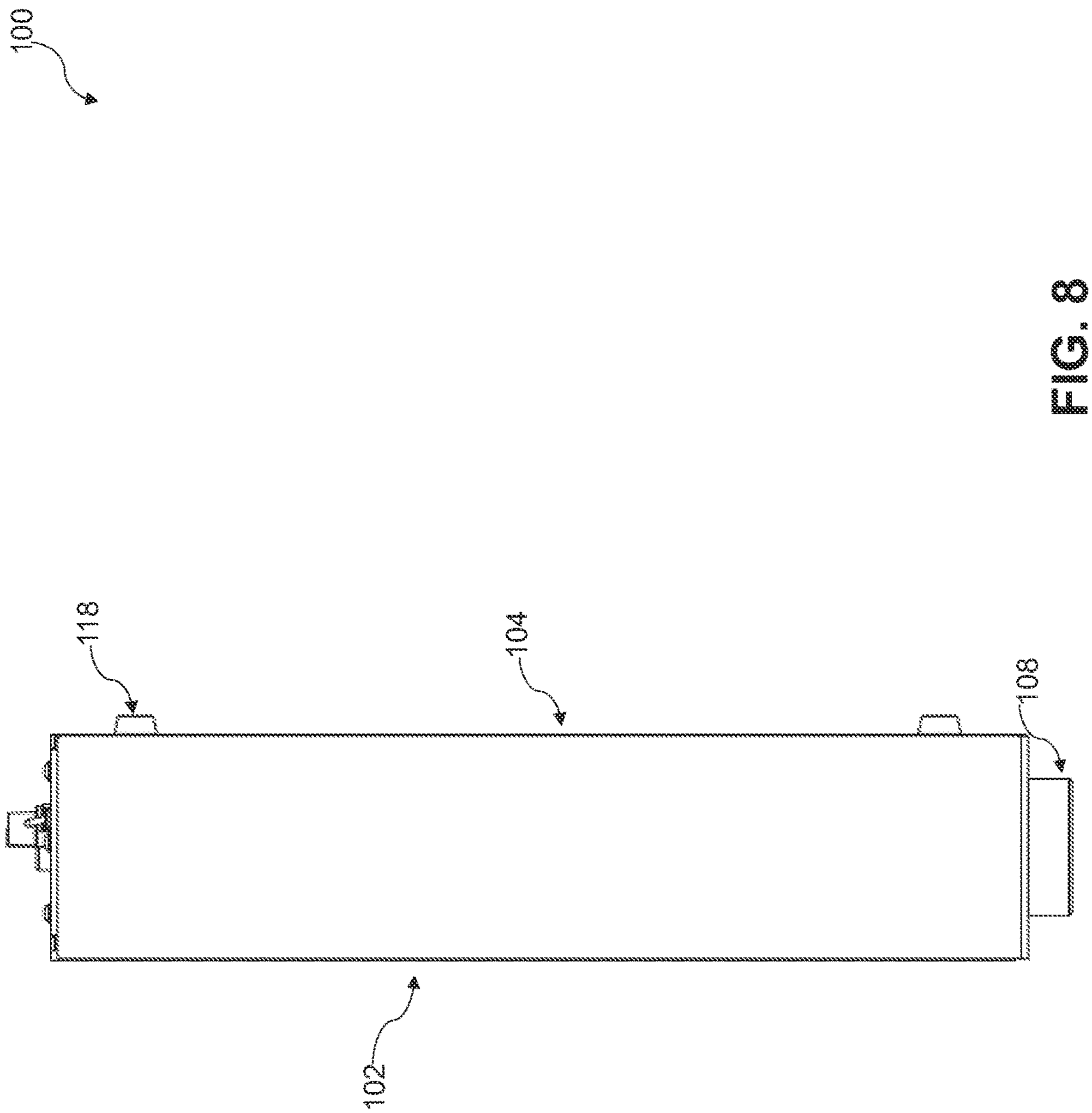
FIG. 8 depicts another side view of a standalone base speaker system that receives a turntable thereon, in accordance with embodiments of the present invention.

Specifically, the base speaker system 100 is an all-in-one powered speaker system for turntables. In preferred examples, the turntable is mounted near or atop of the base speaker system 100. The base speaker system 100 is generally rectangular in shape and may house any energy generating parts of the system. The standalone base speaker system 100 is depicted at least in FIG. 2-FIG. 9. As shown in one or more of FIG. 2-FIG. 9, the base speaker system 100 may comprise the top or first side 102 disposed opposite a bottom or second side 104. The bottom or second side 104 of the base speaker system 100 may contact a horizontal surface, such as a table or bookshelf. In some examples, and as shown in FIG. 3, FIG. 4, and FIG. 6, bottom or second side 104 of the base speaker system 100 may comprise one or more protrusions 118 configured to contact the horizontal surface.

The base speaker system 100 also includes a third side 114 disposed opposite a fourth side 116 and a fifth side 110 disposed opposite a sixth side 112. The fifth side 110 of the base speaker system 100 comprises a knob or dial 108 used to adjust a volume of the audio, which also provides ergonomic support to the user. In preferred examples, the base speaker system 100 is about 46 cm in width by 8 cm in height and 34 cm in length. The preferred size of the base speaker system 100 allows for the accommodation of popular large turntables, including the Numark TT-100, Technics SL-230, and Audio Technica LP-120. Furthermore, the base speaker system 100 provides for Class D amplification of 100 W peaks, 18 W RMS per channel, and a frequency range of 60 Hz to 20 kHz. Moreover, each of the third side 114, the fourth side 116, the fifth side 110, and the sixth side 112 comprise a perforated metal grill, allowing for the transmission of the audio from the base speaker system 100 into a room.

Figure 4:
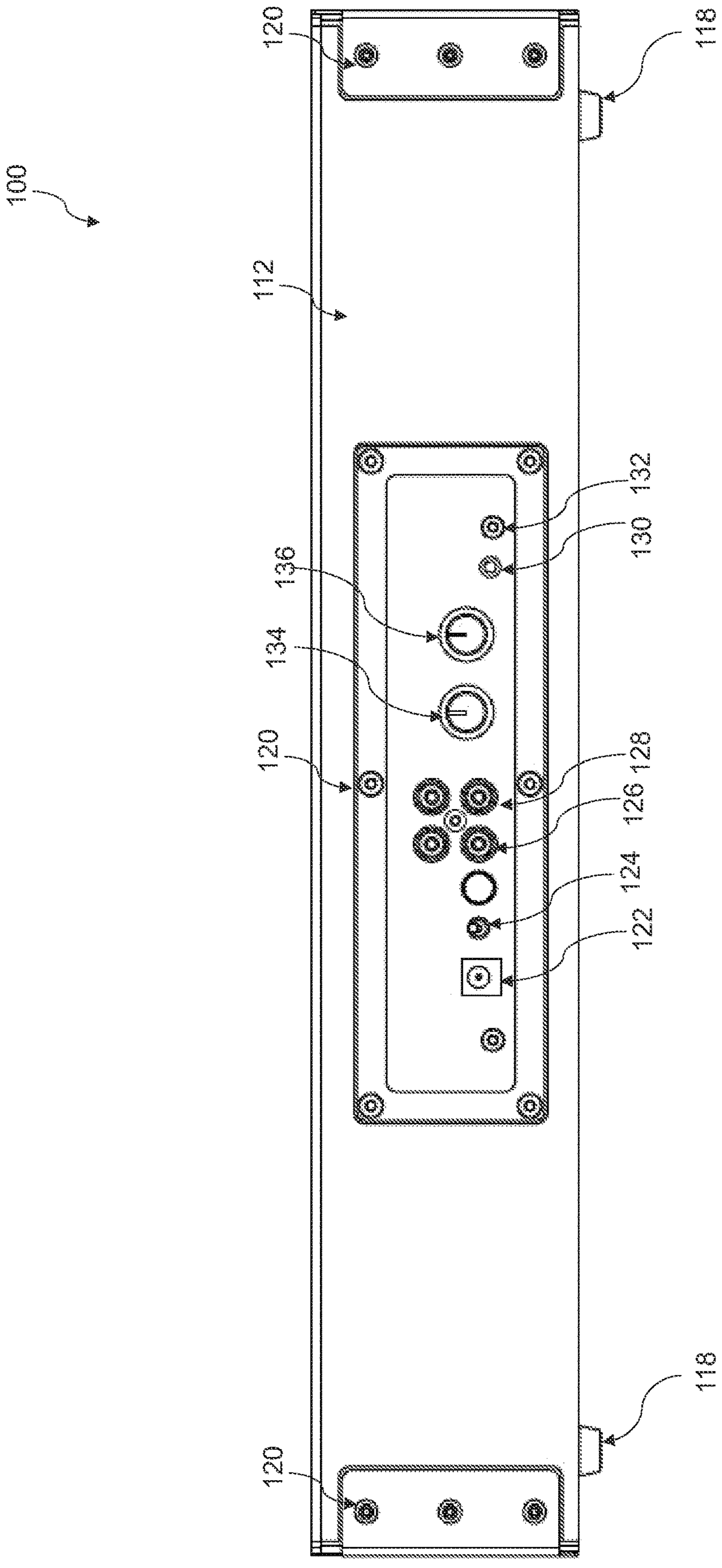
FIG. 4 depicts a rear view of a standalone base speaker system that receives a turntable thereon, in accordance with embodiments of the present invention.
Figure 5:
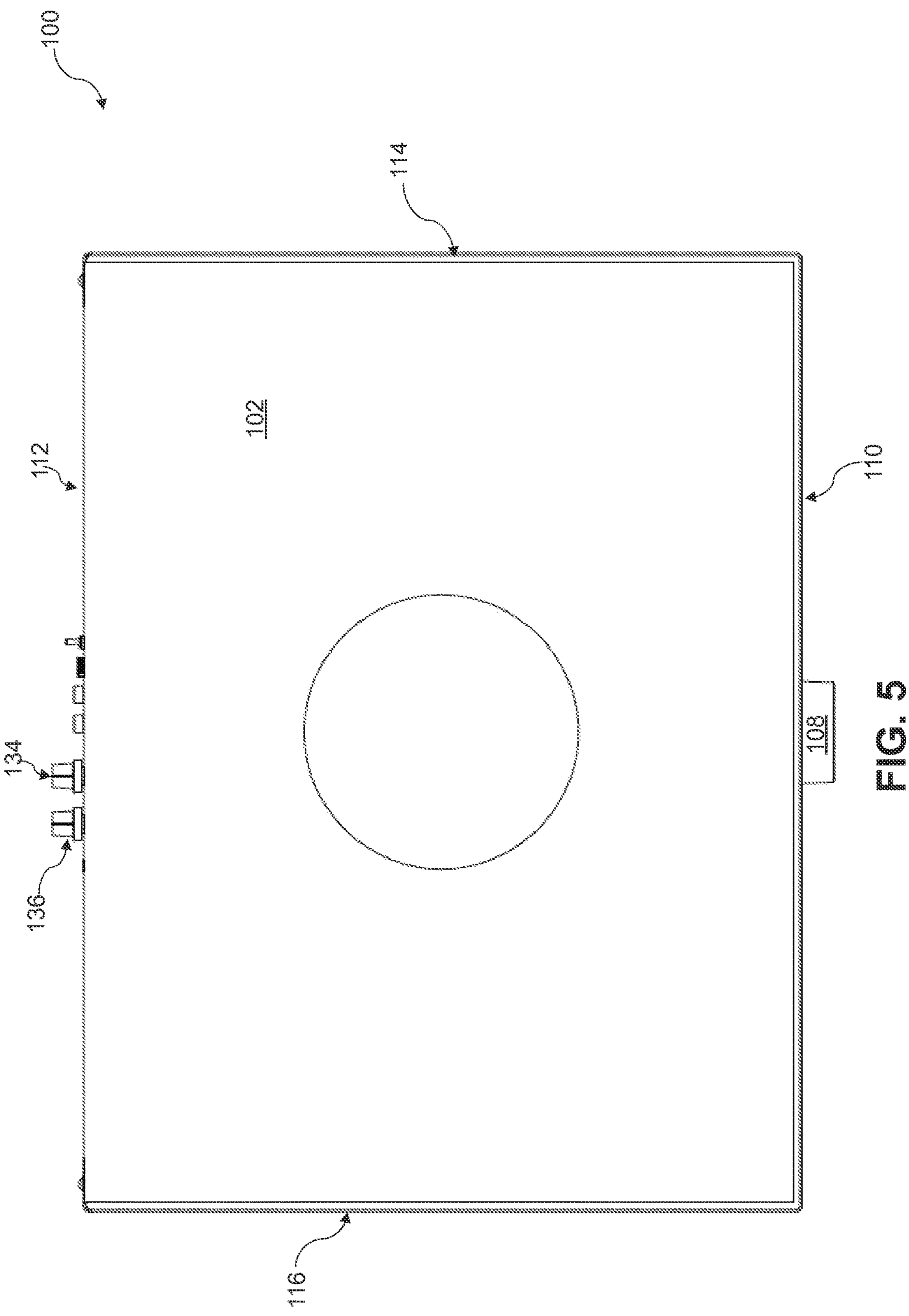
FIG. 5 depicts a top down view of a standalone base speaker system that receives a turntable thereon, in accordance with embodiments of the present invention.

FIG. 4 depicts a schematic diagram of a view of the sixth side 112 of the base speaker system 100. As shown, the base speaker system 100 may easily be connected to numerous devices, such as a turntable, a streaming device, a CD player, a subwoofer, headphones, etc., among other devices not explicitly listed herein. Specifically, the sixth side 112 of the base speaker system 100 includes a power input 122, a ceramic EQ switch 124 (that activates a circuit that adapts the device to the Ceramic cartridge types used in inexpensive turntables), a line level (Aux) input 126, a magnetic phono input 128, a bass EQ control 134, a treble EQ control 136, a headphone output 130, a line level or sub output 132, and/or screws 120 or a similar fastening means. More specifically, the ceramic EQ switch 124 applies a specific EQ tailored for ceramic cartridge support. It should be appreciated that some implementations of the present invention may include some or all of the components listed herein.

Figure 9:
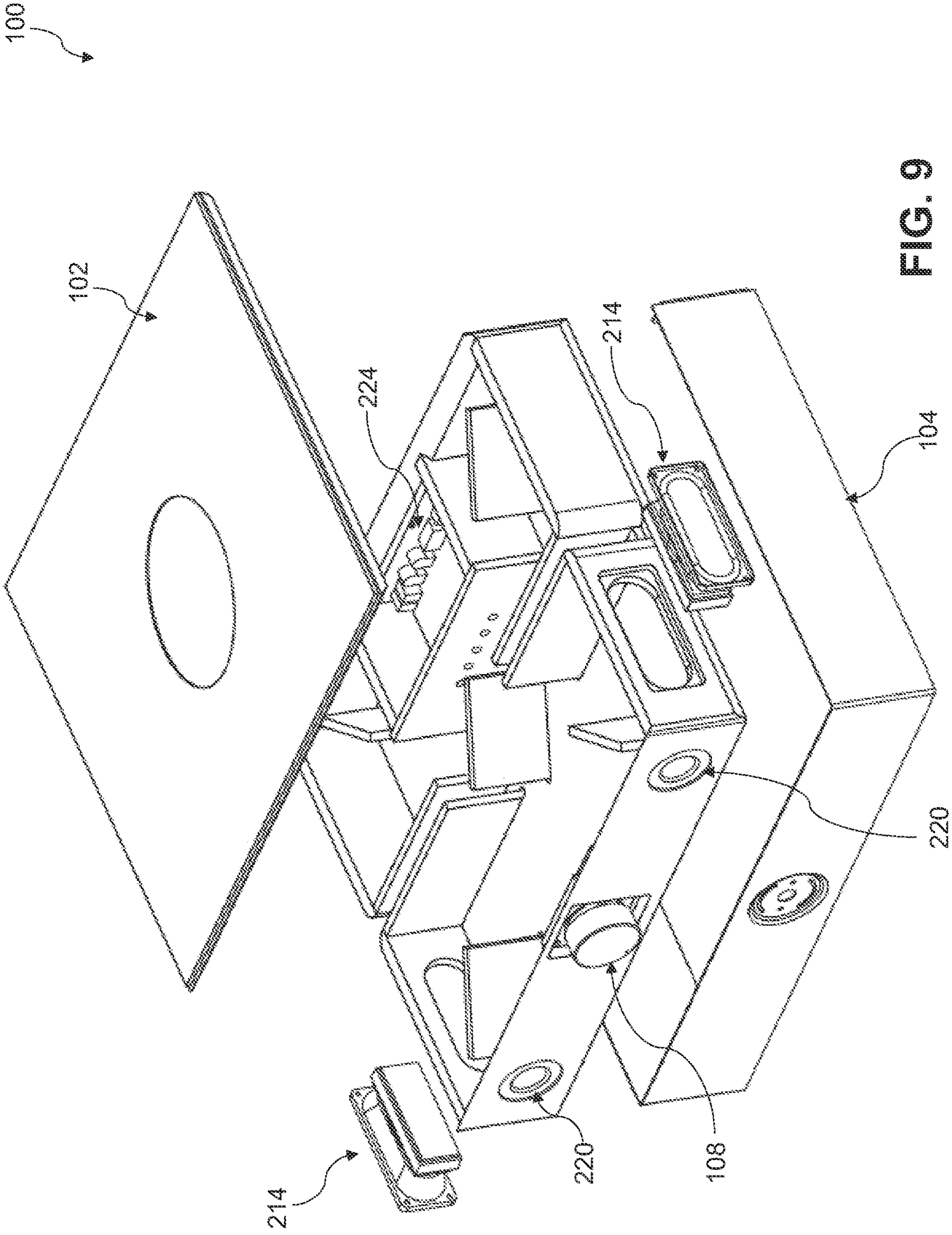
FIG. 9 depicts an exploded view of a standalone base speaker system that receives a turntable thereon, in accordance with embodiments of the present invention.
Figure 10:
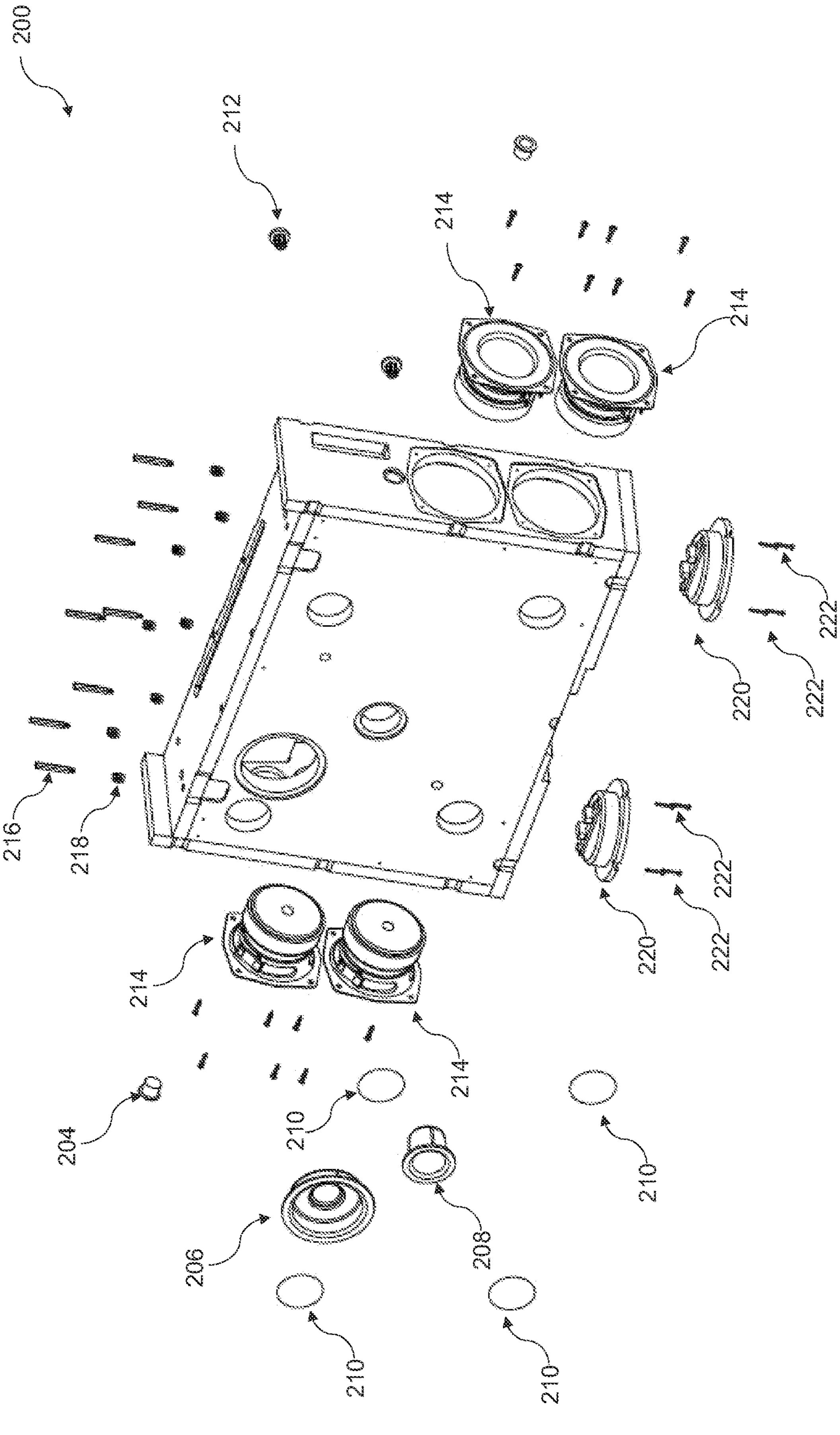
FIG. 10 depicts an exploded view of a cabinet assembly for a built-in setup, in accordance with embodiments of the present invention.
Figure 11:
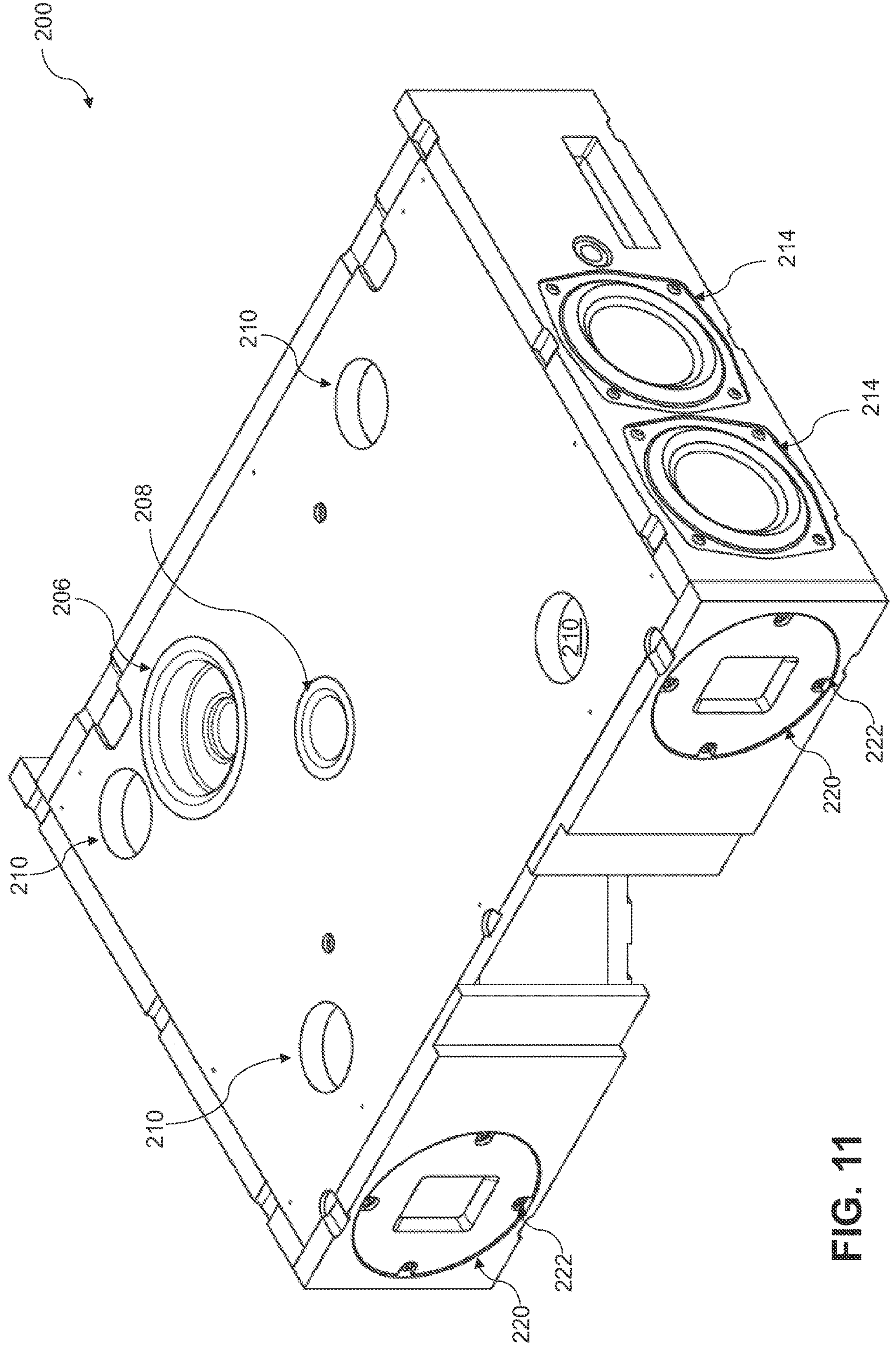
FIG. 11 depicts a perspective view of a cabinet assembly for a built-in setup, in accordance with embodiments of the present invention.
Figure 12:
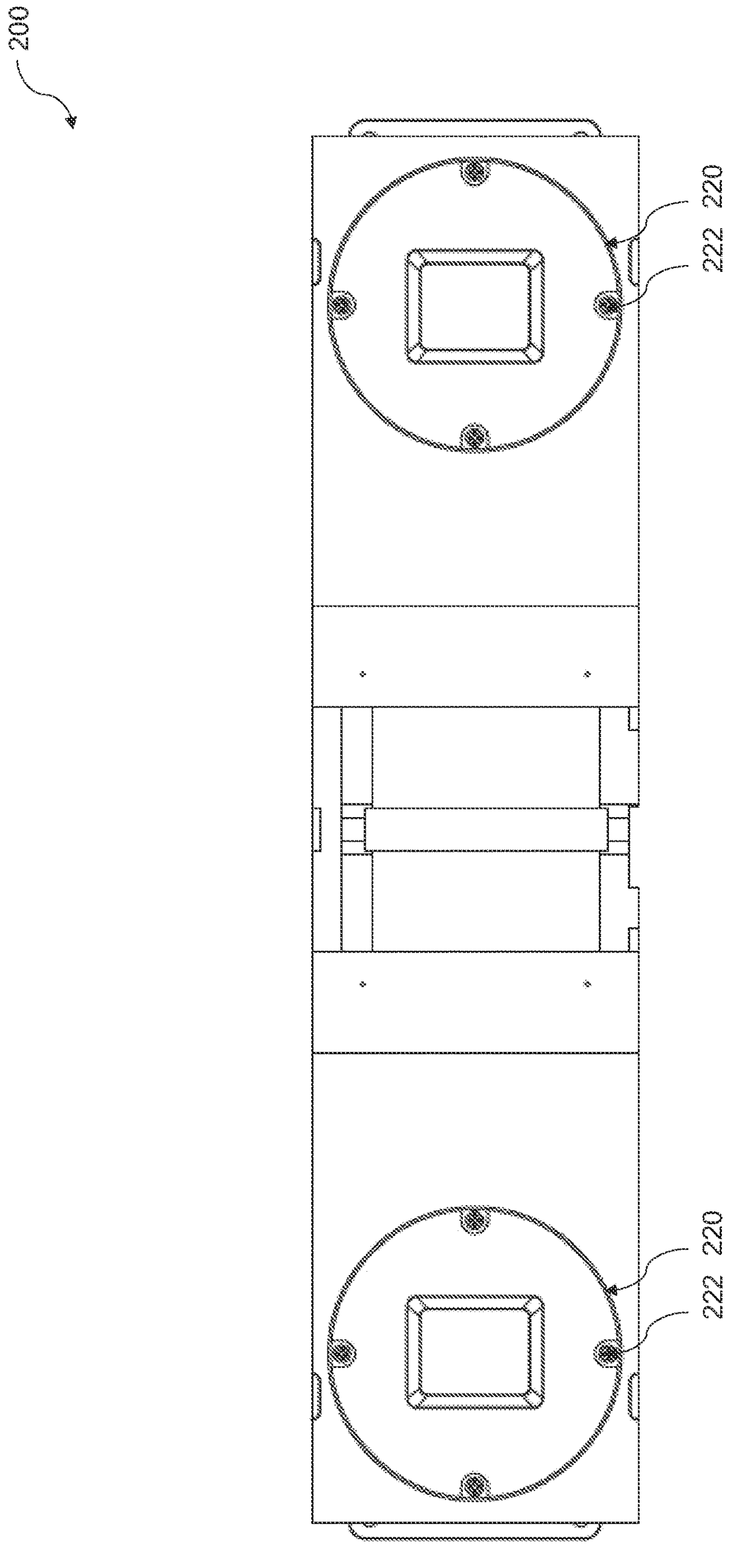
FIG. 12 depicts a side view of a cabinet assembly for a built-in setup, in accordance with embodiments of the present invention.
Figure 13:
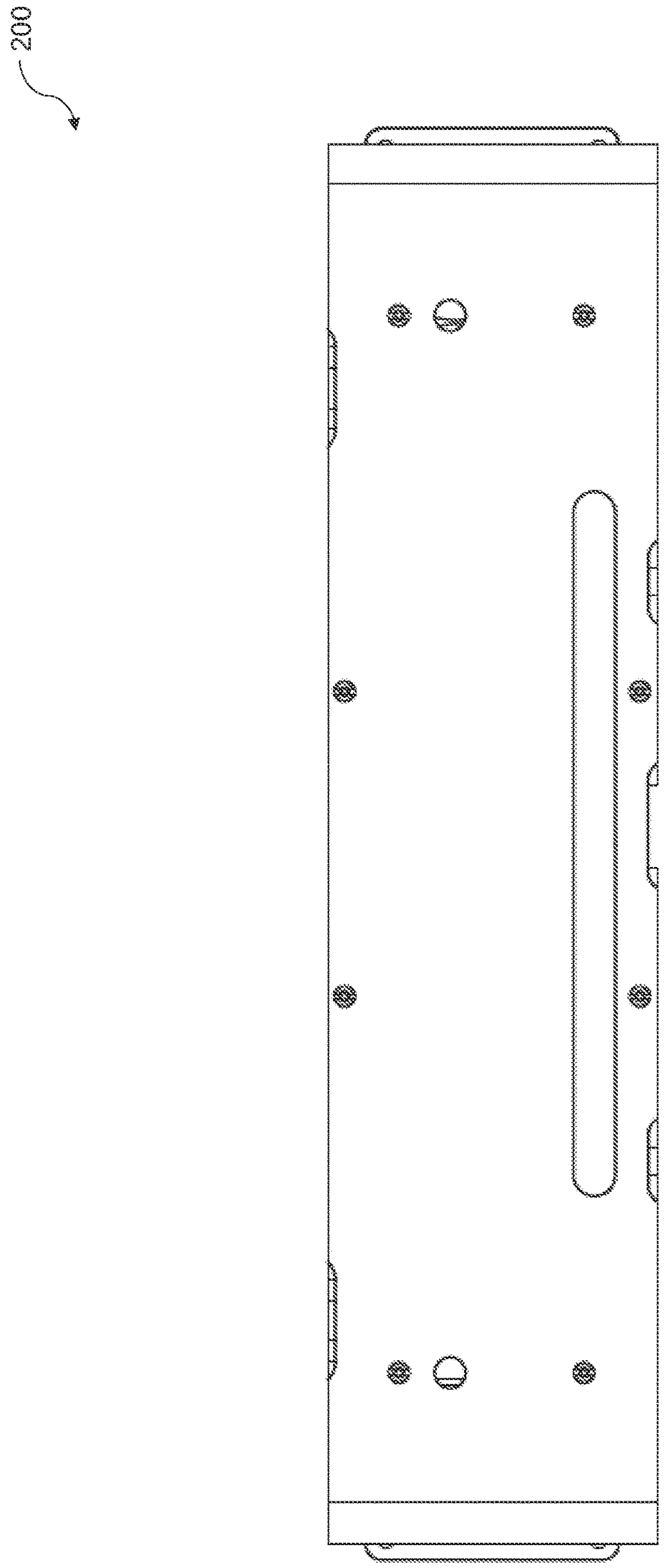
FIG. 13 depicts another side view of a cabinet assembly for a built-in setup, in accordance with embodiments of the present invention.
Figure 14:
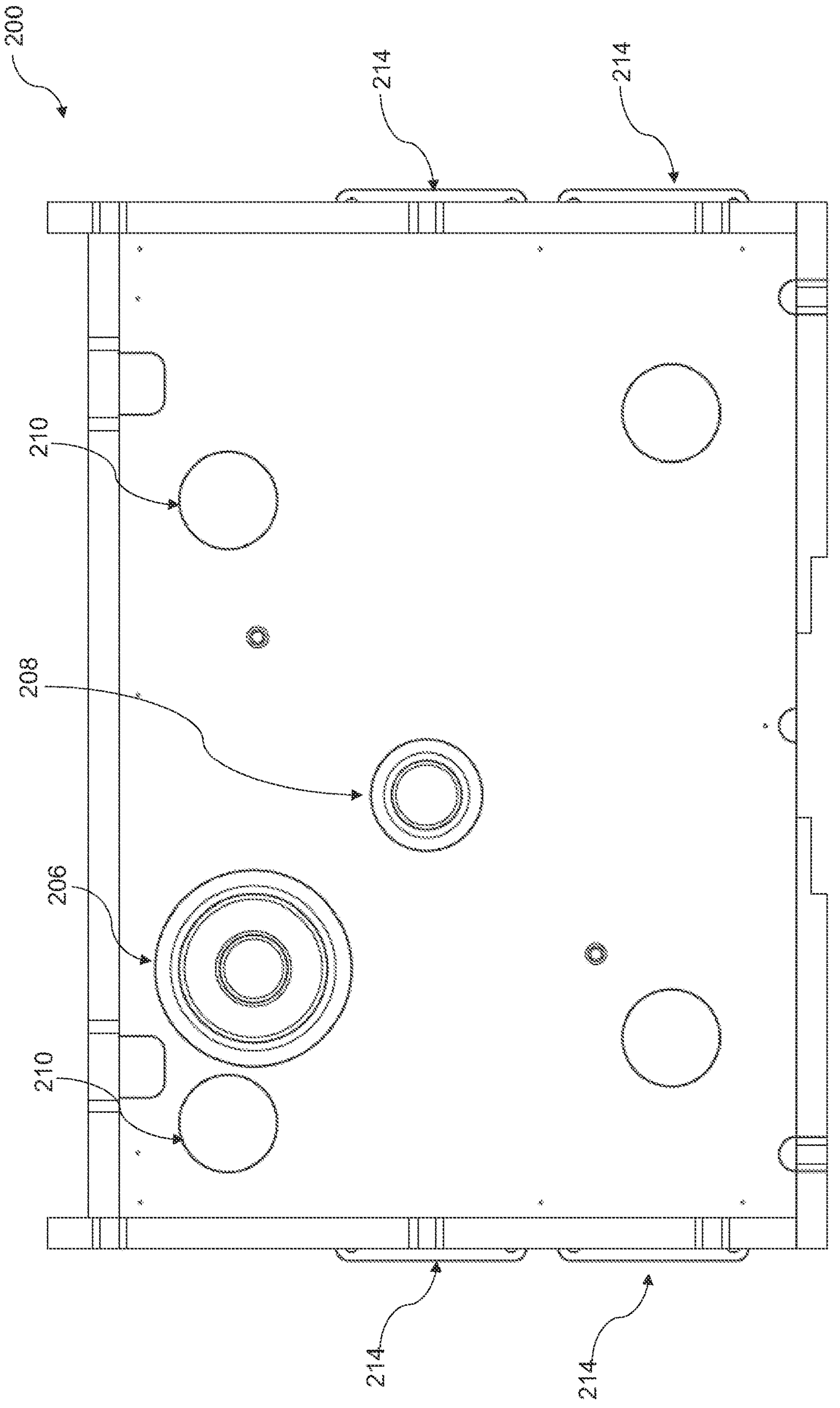
FIG. 14 depicts a top down view of a cabinet assembly for a built-in setup, in accordance with embodiments of the present invention.
Figure 15:
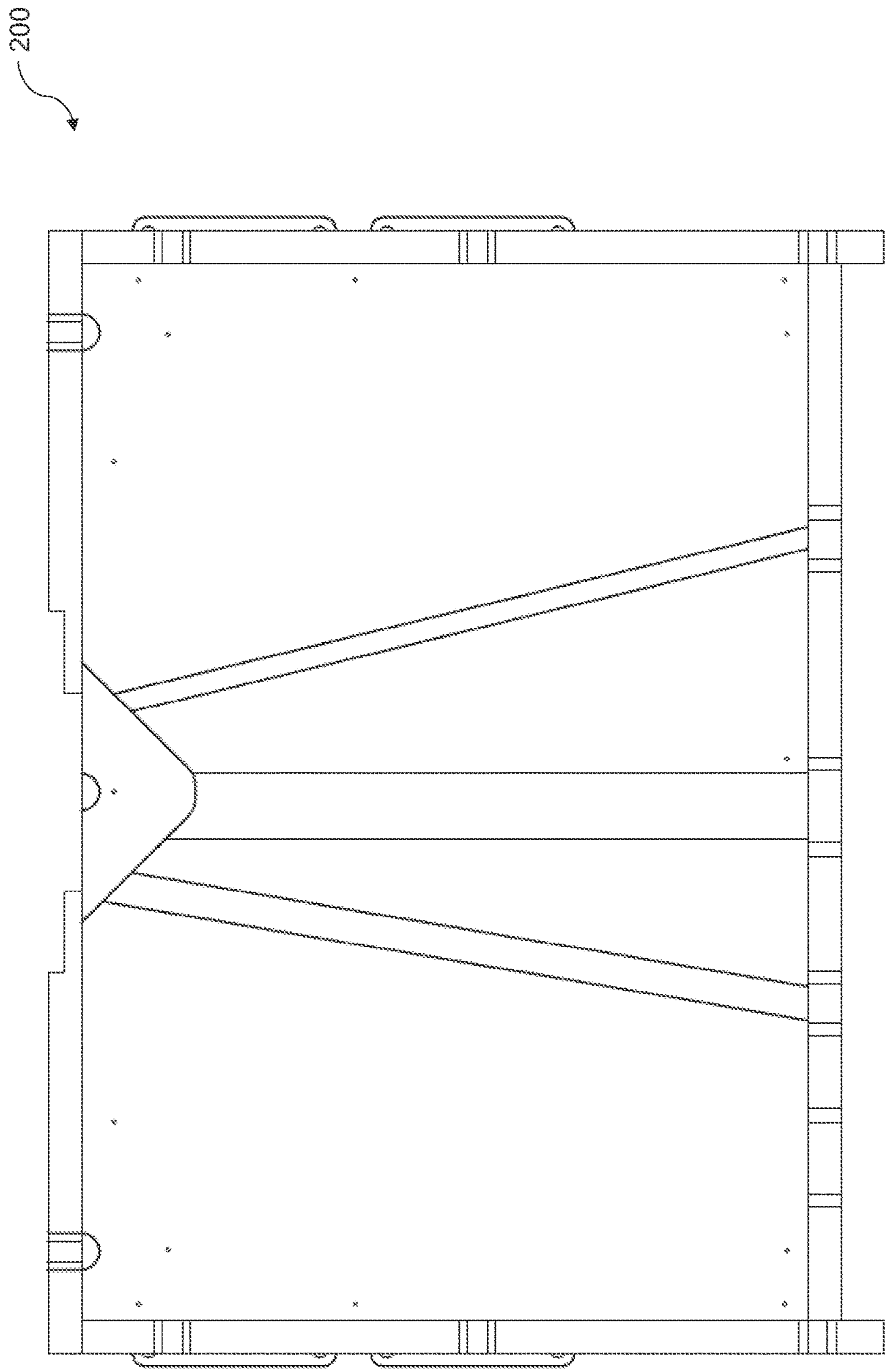
FIG. 15 depicts a bottom up view of a cabinet assembly for a built-in setup, in accordance with embodiments of the present invention.
Figure 16:
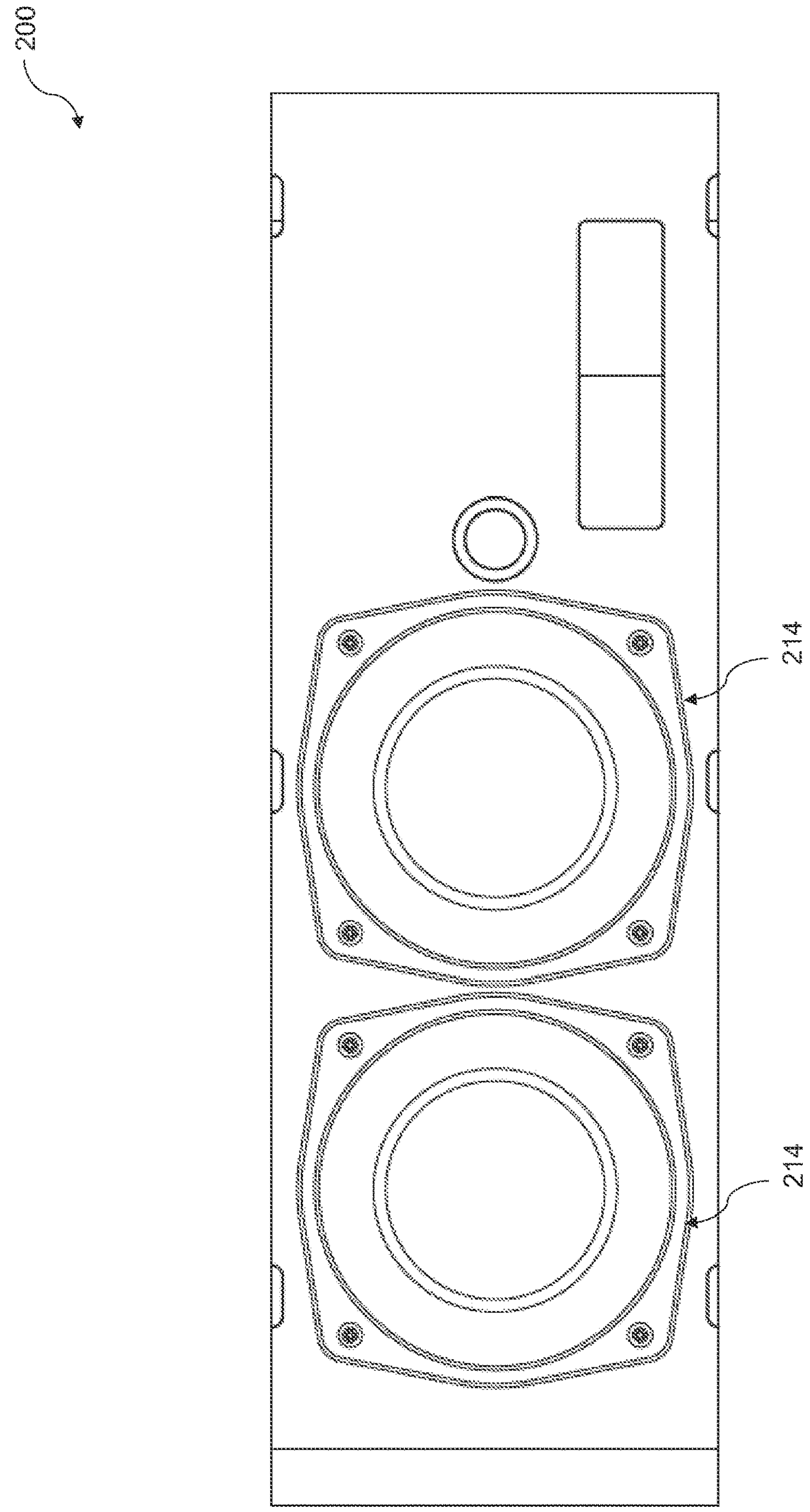
FIG. 16 depicts a side view of a cabinet assembly for a built-in setup, in accordance with embodiments of the present invention.
Figure 17:
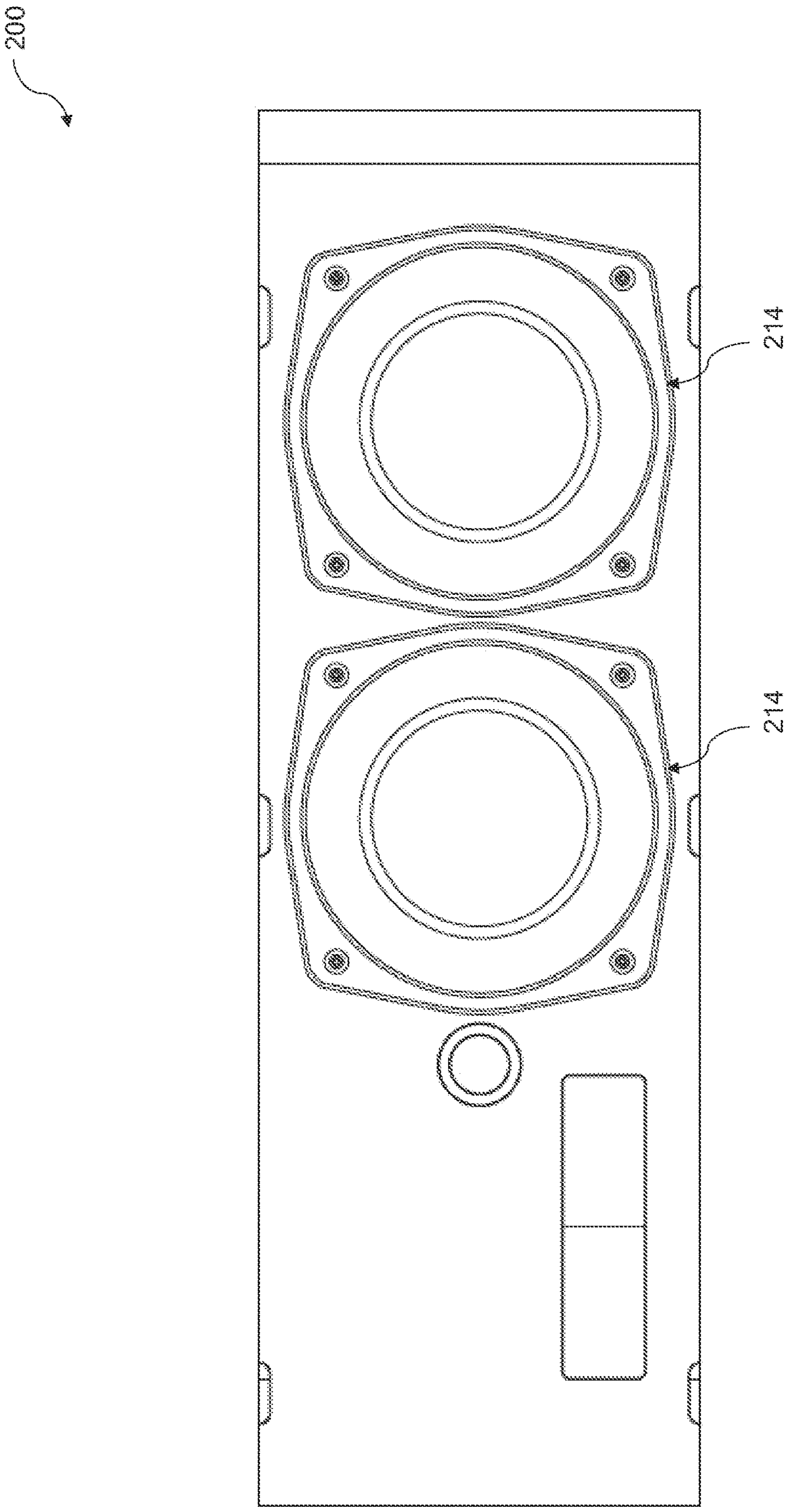
FIG. 17 depicts another side view of a cabinet assembly for a built-in setup, in accordance with embodiments of the present invention.

Moreover, FIG. 9 depicts a built in pre-amp and other required electronics 224 and connections. In examples, the built in pre-amp 224 is a built-in phono preamp. As described herein, the preamp converts the sound signal from the phono cartridge from millivolts to about one volt, which is called line level. Line level is the level that all consumer audio electronics operate within. However, since record players are quieter, their output needs to be amplified by a phono preamp. In other examples, external preamps may be used, which are standalone units that need their own power supply and must be connected to the turntable with RCA cables. Moreover, as described herein, a "phono preamplifier" is an electronic circuit that amplifies and equalizes an analog output of the cartridge in a phonograph turntable.

Moreover, the base speaker system 100 has bass and treble EQ controls (e.g., the bass EQ control 134 and the treble EQ control 136 of FIG. 4). Further, the base speaker system 100 has Bluetooth capability. For example, the base speaker system 100 has a Bluetooth Low Energy electronic receiver and a computing device (not shown) has a Bluetooth Low Energy electronic transmitter and a battery, or vice versa. The computing device may be a computer, a laptop computer, a smartphone, and/or a tablet, among other examples not explicitly listed herein. In other examples, the base speaker system 100 may communicate with other devices, such as the computing device, via another method, such as Wi-Fi or near-field communication (NFC).

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together.

As described herein, "Bluetooth Low Energy" is a wireless personal area network technology aimed at applications in the healthcare, fitness, beacons, security, and home entertainment industries. When compared to classic Bluetooth, Bluetooth Low Energy is intended to provide considerably reduced power consumption and cost while maintaining a similar communication range. Mobile operating systems including iOS, Android, Windows Phone and BlackBerry, as well as macOS, Linux, Windows 8 and Windows 10, natively support Bluetooth Low Energy.

Moreover, the base speaker system 100 comprises a feedback-free performance component. The feedback-free performance component provides a means of preventing feedback, resonance, or other audio-disruptive noise that typically occurs when a turntable is placed near a speaker system. Moreover, the feedback-free performance component prevents vibrations from transferring to the turntable, even if the subwoofer is installed on the same piece of furniture. In examples, the feedback-free performance component of the base speaker system 100 comprises four speaker drivers designed to emit 270° sound dispersion.

Commonly, to locate a turntable in close proximity to loudspeakers without requiring the speakers frequency range to be compromised for the purpose of avoiding acoustic feedback, it is accepted that speakers will produce vibrations and then, the solution becomes to isolate the turntable from those vibrations. This is the common technique currently used by record players in the field, which results in a bouncy structure sensitive to any external instability, such as bouncy floors or furniture. Distinctly, the feedback-free performance component of the present invention reduces these vibrations at the source so that isolation efforts are not required. Specifically, the base speaker system 100 configures low frequency transducers on opposing sides of the base speaker system 100 in order to cancel the vibrations from the opposite channel. While this arrangement is used with some with monaural subwoofers, it is uncommon with a stereo pair of full-range speakers. With stereo speakers, any difference between the two channels will not cancel, and feedback will not be eliminated under those conditions.

Some similar subwoofers use opposed woofers, but only on mono, low frequency signals, which are not intended for full-range reproduction. Further, some record players known in the art have side-mounted speakers, but do not use any sort of mono processing, where these record players are limited in frequency range and volume level to avoid the feedback problem.

The instant invention improves upon this. To prevent imperfect cancellation, the present invention mixes stereo channels to mono signals at low bass frequencies to maintain the vibration cancelling effect. Any dynamic signal processing or equalization required by different models is performed on this monaural signal. It should be appreciated that, as described herein, "monaural" or monophonic sound reproduction is sound intended to be heard as if it were emanating from one position. Frequencies above this are kept as stereo signals to maintain the stereo separation. This low frequency mono signal mixing is performed within digital signal processing or DSP in the present invention, but it may also be done via analog circuitry in other embodiments. The mono signal is mixed back into the stereo signal path for delivery to the left and right loudspeakers, respectively.

Additionally, the present invention minimizes the vibration of the surface intended to place the turntable, by bracing it to its opposite panel. The panels vibrate in equal and opposite directions based on the audio signal and therefore also provide significant cancellation of the vibration that remains after the first part.

FIG. 10-FIG. 17 depict another embodiment of the present invention, a cabinet assembly 200 for a built-in setup. The cabinet assembly 200 functions like the base speaker system 100. In preferred examples, the cabinet assembly 200 comprises numerous components, such as: about four foot felts 210, about eight standoff components 216, about eight insert components 218, about two shipping screw inserts 212, four woofers 214, two tweeters 220, a left woofer cable (not shown), a right woofer cable (not shown), a left tweeter cable (not shown), a right tweeter cable (not shown), about fifty-seven driver gaskets (not shown), about twenty-four driver screws 222, a spindle cup 208, a motor cup 206, and about two grill frame cups 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles “a,” “an,” and “the” are intended to mean that there are one or more of the elements. Similarly, the adjective “another,” when used to introduce an element, is intended to mean one or more elements. The terms “including” and “having” are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system comprising:

a turntable disposed on a base speaker system; and the base speaker system configured as an enclosure having an internal portion and an external portion, the base speaker system being configured to eliminate audio-disruptive noise, wherein the base speaker system comprises at least:

a power input to power the base speaker system;

a built-in power amplifier with or without a phono preamp;

one or more woofers; and one or more tweeters, wherein the base speaker system is configured to mix stereo channels to mono signals at low bass frequencies to maintain a vibration cancelling effect such that any dynamic signal processing or equalization required by different models is performed on a monaural signal.

2. The system of claim 1, wherein the base speaker system further comprises a connection means to connect a device to the base speaker system.

3. The system of claim 2, wherein the device is selected from the group consisting of: the turntable, a streaming device, a CD player, a subwoofer, and headphones.

4. The system of claim 1, wherein a quantity of the one or more woofers is four.

5. The system of claim 1, wherein the one or more woofers are low frequency transducers located on opposing sides of the base speaker system to cancel vibrations from an opposite channel.

6. The system of claim 1, wherein a quantity of the one or more woofers is two.

7. The system of claim 1, wherein each of the one or more tweeters are located on a front of an enclosure.

8. The system of claim 1, wherein frequencies above the monaural signal are maintained as stereo signals to maintain stereo separation.

9. The system of claim 8, wherein the base speaker system is further configured to perform low frequency monaural signal mixing.

10. The system of claim 9, wherein the low frequency monaural signal mixing occurs via a digital signal processing means or via analog circuitry.

11. The system of claim 10, wherein the base speaker system is further configured to mix the monaural signal back into the stereo signal path for delivery to loudspeakers.

12. The system of claim 1, wherein the base speaker system is further configured to:

minimize a vibration of a surface intended to place the turntable, by bracing it to its opposite panel, such that the panels vibrate in equal and opposite directions based on an audio signal and provide cancellation of the vibration.

13. The system of claim 1, wherein the base speaker system is a standalone system that receives the turntable thereon.

14. The system of claim 1, wherein the system is configured as a cabinet assembly for a built-in setup.

* * * * *